United States Patent [19]
Kunisaki et al.

[11] Patent Number: 5,155,857
[45] Date of Patent: Oct. 13, 1992

[54] COMMUNICATION PROCESSING SYSTEM IN WHICH COMMUNICATION BY TERMINALS IS CONTROLLED ACCORDING TO A TERMINAL MANAGEMENT TABLE

[75] Inventors: Osamu Kunisaki; Tosikazu Yasue, both of Yokohama; Shiro Oishi; Yuuji Saeki, both of Hadano, all of Japan

[73] Assignee: Hitachi, Ltd., Tokyo, Japan

[21] Appl. No.: 198,206

[22] Filed: May 25, 1988

[30] Foreign Application Priority Data

May 29, 1987 [JP] Japan .................. 62-131178

[51] Int. Cl.⁵ .............................................. G06F 13/00
[52] U.S. Cl. ........................ 395/800; 364/229.0; 364/238.3; 364/241.0; 364/243.0; 364/DIG. 1
[58] Field of Search ............... 340/825.06, 825.08, 340/825.5, 825.51; 370/85.8, 95.2; 395/800; 364/900 MS File, 200 MS File

[56] References Cited

U.S. PATENT DOCUMENTS

| | | | |
|---|---|---|---|
| 3,949,380 | 4/1976 | Barbour et al. | 364/200 |
| 4,228,496 | 9/1976 | Katzman et al. | 364/200 |
| 4,638,428 | 1/1987 | Gemma et al. | 364/200 |
| 4,683,531 | 7/1987 | Kelch et al. | 340/825.08 |
| 4,800,488 | 1/1989 | Agrawal et al. | 340/825.06 |
| 4,845,609 | 7/1989 | Lighthart et al. | 364/200 |
| 4,939,726 | 7/1990 | Flammer et al. | 370/94.1 |
| 4,951,281 | 8/1990 | Muto et al. | 370/95.2 |
| 4,979,104 | 12/1990 | Holtey et al. | 364/200 |

FOREIGN PATENT DOCUMENTS 0145945 6/1987 Japan ............... 340/825.08

OTHER PUBLICATIONS

Texas Instruments, TTL Data Book, vol. 2, 1985, pp. 2-4 to 2-5.

*Primary Examiner*—David Y. Eng
*Assistant Examiner*—William M. Treat
*Attorney, Agent, or Firm*—Antonelli, Terry, Stout & Kraus

[57] ABSTRACT

A terminal controller detects state of a plurality of terminal devices by polling system, and the detected state is in a terminal management table possessed by the terminal controller and each terminal device, and the communication processing is performed corresponding to the table content. The terminal controller and each terminal device comprise respectively a main processor connected through a bus to a main memory and a communication control adapter. The communication control adapter is composed of a local processor, a local memory and a communication data send/receive circuit, and terminal management table region is provided on the main memory and the local memory. The local processor executes management of the terminal management table, and rewrites the terminal management information on the local memory and at the same time transfers the terminal management information onto the main memory by the DMA function provided on the communication control adapter.

14 Claims, 4 Drawing Sheets

COMMUNICATION PROCESSING SYSTEM IN WHICH COMMUNICATION BY TERMINALS IS CONTROLLED ACCORDING TO A TERMINAL MANAGEMENT TABLE

BACKGROUND OF THE INVENTION

The present invention relates to communication processing methods in a cluster communication system, and more particularly to a communication processing method which can perform management of terminal management information efficiently and an apparatus therefor.

In a cluster communication system in the prior art, as disclosed in Japanese patent application laid-open No. 60-160750, a terminal controller performs communication control for each terminal device according to a communication control using a polling command. In this communication control system, the terminal controller and each terminal device respectively have their own pieces of information, and only the apparatus having the address contained in the transmission data can receive the data. The terminal controller transmits a frame which represents an invitation to send, called a polling frame, to each terminal device. A terminal device which receives this frame, that is, only a terminal device having the address contained within the frame, is allowed transmission of a data frame transmitted by the terminal controller or other terminal device. This is called acquisition of the right to send data.

In such a cluster communication system using communication control by polling command in the prior art, the terminal controller performs terminal management according to a terminal status management table which stores the status of each terminal device. The polling frame is transmitted in sequence corresponding to the content of this terminal status control table.

On the other hand, when each terminal device performs data transmission to the terminal controller or another terminal device, the following procedure is used. (1) The right to send data is acquired by polling, and (2) the transmission data is embedded in a frame having the destination station address and the frame is transmitted. (3) Response from the destination station is received, and (4) the right to send data is returned to the terminal controller. However, if there is no transmission data, items (2), (3) are omitted, and the right to send data is immediately returned.

In such a communication system, since each terminal device has means for determining the terminal status within the same cluster, when the destination station terminal is not ready for receiving data, a useless transmission, such as power source OFF or BUSY state, can be avoided. A method for each terminal device to determine the terminal state within the same cluster is as follows. In order that all terminal devices can receive the data frame commonly, a global address is provided, and every time the control of the terminal management table varies, the terminal controller transmits the terminal management table information to all terminal devices. In this way, each terminal device always can know the newest terminal management state of the same cluster, and a useless transmission is not repeated, or each time the transmission is performed, the state of the transmission destination terminal need not be indicated to the terminal controller, with the result that the line use efficiency is improved.

A system for performing data transmission to a number of terminal devices together is disclosed in Japanese patent application laid-open No. 57-101933.

In the cluster communication system, the terminal controller and each terminal device (hereinafter referred to as each communication processing system or each device) are usually provided with an adapter to perform communication control. In other words, if the main processor of each device undertakes all of the communication control, it is difficult for the device to attend to the performance of the communication processing. Consequently, it is usual for the communication control adapter installed on each device to perform communication processing for the lower level, for example, the data link level.

When each device is provided with information to control the terminal state in the cluster communication system, the information is stored in table form in the memory. In this case, the memory must be able to be accessed from both the main processor and the communication control adapter. That is, the terminal management table is mainly controlled by a program in the main processor. On the other hand, the communication control of the lower level is performed by the communication control adapter, and in order to improve the line use efficiency, the adapter must access the terminal management table and know the state of the destination station of a communication, and depending on the result, it must discriminate whether data should be transmitted or not. Consequently, a contention state for access from both the main processor and the communication control adapter to the terminal control table may be produced, resulting in deterioration of the communication control processing.

SUMMARY OF THE INVENTION

An object of the invention is to provide a communication processing system using a terminal management table where the terminal management information can be efficiently controlled.

Another object of the invention is to provide a communication processing system using a communication control adapter which obviates the overhead for the communication control processing.

A further object of the invention is to provide a communication processing system where a polling system is used, and the terminal device to constitute a cluster system and the terminal management table to control the state of the terminal controller can be efficiently controlled.

In order to attain the above objects, in accordance with the invention, each of the terminal device and the terminal controller are constituted by a main processor, a main memory and a communication control adapter, and the adapter is constituted by a local memory, a local processor and a communication data send/receive circuit, so that the terminal management information is stored by both the main memory and the local memory, and the terminal management information is controlled by the local processor.

Further in accordance with the invention, the local processor rewrites the terminal management information in the local memory, and also transfers the terminal management information to the main memory.

That is, the invention is characterized in that the terminal control tables are provided both in the main memory accessed by the main processor and in the local memory accessed by the communication control adapter, the communication control adapter is provided with a DMA (Direct Memory Access) function, and the terminal management table is controlled by the communication control adapter, thereby the table information is varied only at the side of the local memory, and at the time of the variation the information is transferred to the table at the side of the main memory by the DMA function so that matching of both occurs.

The communication control adapter has a function by microprogram control, and can the content of the terminal management table provided in the local memory thereby the content of the table can be varied.

According to the DMA function contained in the communication control adapter, the content of terminal management table can be transferred immediately at the time of its variation according to the command of the microprogram into the terminal management table in the main memory at the side of the main processor.

In this way, the communication control adapter controls variation of the content of the terminal control table, and the varied content of the table can be simultaneously reflected to the terminal control table in the main memory so that the content of both can be always coincident.

DETAILED DESCRIPTION OF THE PREFERRED EMBODIMENTS

Embodiments of the invention will now be described in detail referring to the accompanying drawings.

Figure 2:
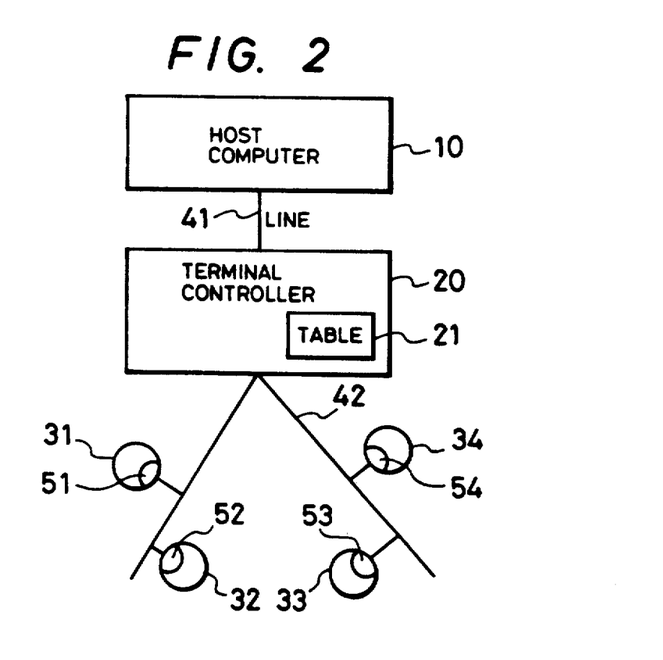
FIG. 2 is a block diagram illustrating the overall system configuration of the communication processing system of the invention.

FIG. 2 is a block diagram illustrating the overall configuration of an embodiment of a cluster communication system in accordance with the invention. A terminal controller 20 is disposed between a host computer 10 and a plurality of terminal devices 31-34. The terminal controller 20 and the host computer 10 are coupled to each other by a line 41, and the terminal controller 20 is coupled to the terminal devices 31-34 by a line 42. A plurality of lines 42 extend from the terminal controller 20, and a plurality of terminal devices are connected to these lines; for example, terminal devices 64 or 128 in number as a whole are connected. The terminal controller 20 controls communication between the host computer 10 and the terminal devices 31-34 (vertical distribution communication), and also controls mutual communication between the terminal devices 31-34 (horizontal distribution communication). Consequently, a terminal management table 21 performs management of the state of the terminals giving the right of sending data to each of the terminal devices 31-34 and controlling the state, and the terminal controller 20 distributes the content of the terminal management table 21 to terminal management tables 51-54 in each of the terminal devices 31-34 simultaneously.

The terminal management tables 21, 51-54 possessed by the terminal controller 20 and the terminal devices 31-34 exist specifically at two positions, a main memory and a local memory, within each device.

Figure 1:
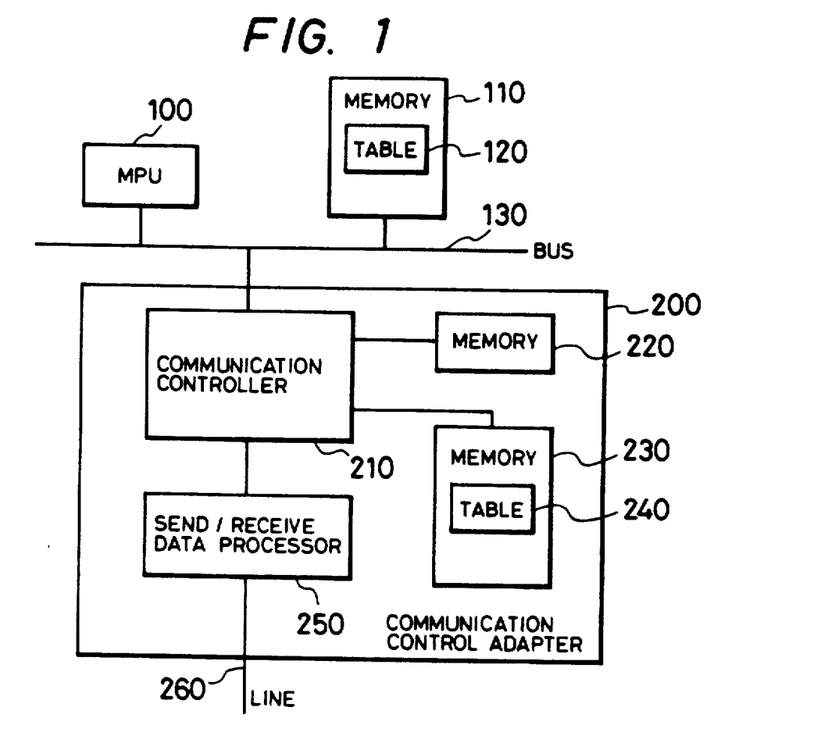
FIG. 1 is a block diagram illustrating an outline of an embodiment of a terminal controller or a terminal device in a communication processing system of the invention.

Next, FIG. 1 is a block diagram illustrating the internal configuration of each terminal device. A main processor (MPU) 100, a memory 110 operating as a main memory, and a communication control adapter 200 are coupled by a bus 130. The communication control adapter 200 is coupled to the bus 130. The communication control adapter 200 comprises a communication controller 210 performing processing of a data link layer or the like, a memory 220 storing a microprogram to control the communication controller 210 a memory 230 operating as a local memory storing a working region or processing data to be used for the communication processing, and a send/receive data processor 250 performing modulation/demodulation processing of send/receive data, serial/parallel conversion processing or the like. A line 260 extends from the send/receive data processor 250 to other devices. The memory 110 operating as a main memory and the memory 230 operating as a local memory are provided with terminal management tables 120 and 240, respectively. The communication controller 210 has a DMA function for transferring data from the memory 230 into the memory 110, as will be hereinafter described.

In this arrangement, a procedure for updating the terminal management table will be described in the case where the device in FIG. 1 operates as a terminal device. The terminal controller determines the state of each terminal by polling, and updates the content of the terminal management table as hereinafter described in detail, and transmits the information immediately to each terminal. In the terminal device, the information passes through the line 260 and is stored via the send/receive data processor 250 and the communication controller 210 in the terminal management table 240 in the memory 230 operating as a local memory. In the communication controller 210, at the time of completion of receiving the transmitted information, the content of the terminal management table 240 is transferred by the DM function to the terminal management table 120 in the memory 110 operating as a main memory.

On the other hand, when the main processor (MPU) 100 performs a communication processing at a higher level than that of the network layer, in order to know the state of other terminal devices in the cluster system, the terminal management table 120 must be accessed. In this case, the MPU 100 only reads and does not write. Consequently, rewrite of the terminal management table is entirely performed within the communication control adapter 200, and information of the terminal control table 120 is always identified by the DMA transfer from the table 240 to the table 120.

The above description relates to the case where the device in FIG. 1 is a terminal device. Also, in the case where the device of FIG. 1 operates as the terminal controller, the process of determining the state of each terminal device and rewriting the terminal management table is performed in that the communication controller 210 of the communication control adapter 200 rewrites the table 240. At the same time, according to the DMA function, the content of the table 240 within the local memory is transferred to the terminal management table 120 in the main memory 110. When the state of one terminal device is varied and in order to indicate this to each terminal device, the content of the terminal management table is transmitted, the main processor 100 commands the communication control adapter 200 and the content of the table 240 is transmitted through the line 260 by microprogram control. Thus, the content of both tables 240 and 120 can be always coincident.

Figure 3:
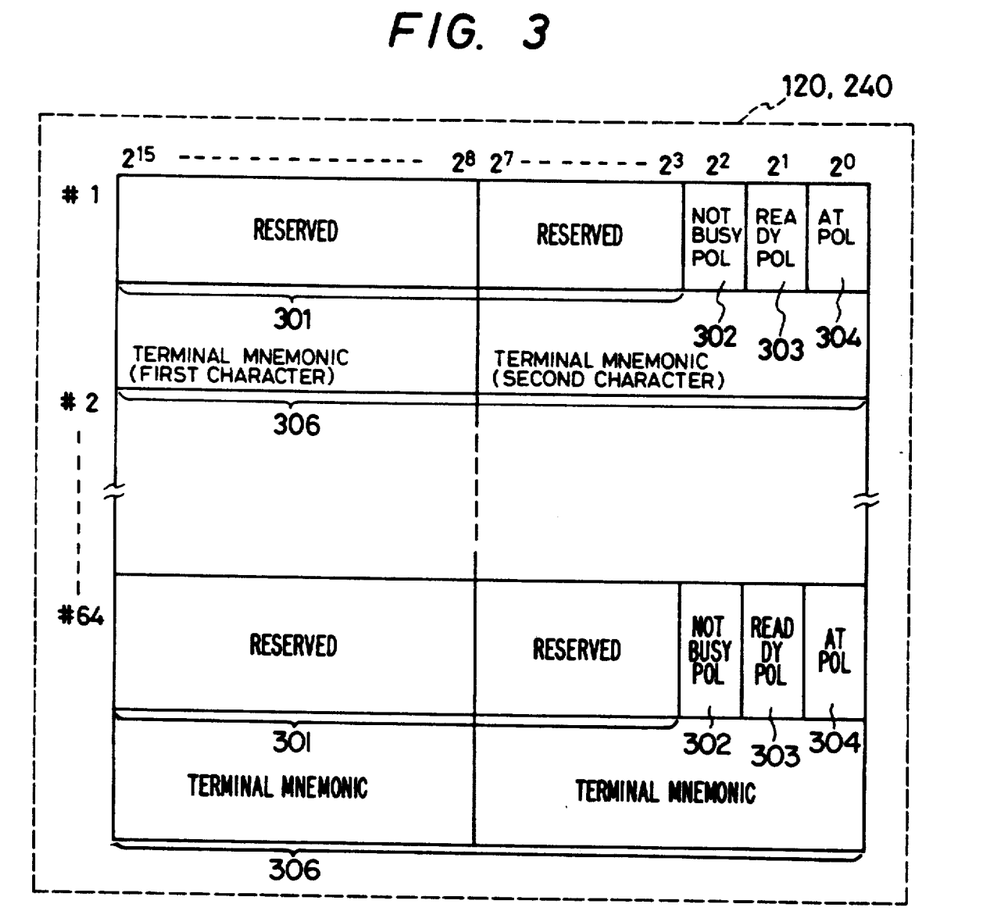
FIG. 3 is a schematic diagram illustrating an embodiment of a terminal management table used in the communication processing system of the invention.

FIG. 3 shows an embodiment of the format of the terminal management tables 120, 240. The details are disclosed, for example, in Japanese patent application No. 62-47141 previously filed by the present inventors (application date : Mar. 2, 1987). FIG. 3 exemplifies the case in which there are 64 terminals. The address of each terminal device corresponds to a terminal number #1-#64 to which is added a fixed value. That is, if the fixed value is '3F' (hexadecimal number), the address of the terminal device #1 becomes '40', and the address of the terminal device #2 becomes '41'. In the tables 120, 240, the management table length per one terminal device is represented by 2 words (=4 bytes).

The upper words from $2^{15}$ bits to $2^3$ bits 501 are reserved for the system, and the lower 2 bytes 306 represent the mnemonic of the terminal name. The $2^2$ bit (NOT BUSY POL) 302 is a terminal busy state supervisory bit, and becomes '1' at the busy state. The polling period to the terminal device at the state is lengthened, thereby transmission of a useless polling frame is prevented and the line use efficiency can be improved. That is, when the NOT BUSY POL bit 302 is '1', the polling period becomes long. The terminal controller 20 checks the NOT BUSY POL bit 302, and determines the polling operation. The $2^1$ bit (READY POL) 303 is a power supervisory bit. When the power source is OFF, the READY POL bit 303 becomes '1', and the polling period becomes long also in this case. The $2^0$ bit (AT POL) 304 is a supervisory bit for request of the right to send data from a terminal. When the terminal device is in state other than busy (NOT BUSY POL bit is 0) or the power source is ON (READY POL bit is 0), the AT POL bit 304 becomes '1'. When either of the READY POL bit 303 and the NOT BUSY POL bit 302 becomes '1', the AT POL bit 304 becomes '0' and the polling period becomes long in this case.

Figure 4:
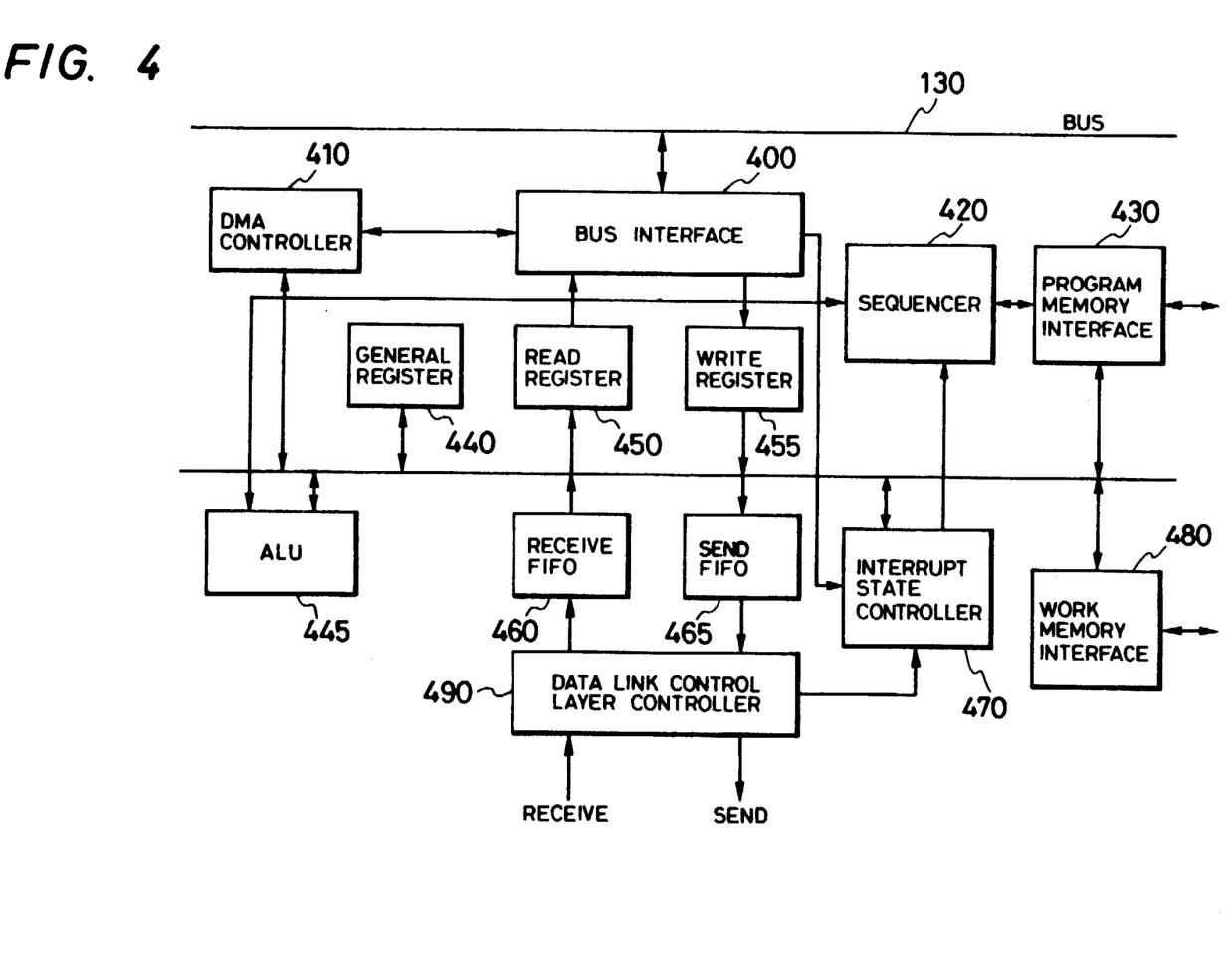
FIG. 4 is a block diagram illustrating an embodiment of a communication controller 210 in the block diagram shown in FIG. 1.

FIG. 4 shows an embodiment forming a specific example of a communication controller 210 as shown in FIG. 1. In FIG. 4, the interface between the bus 130 to couple the upper MPU 100 with a communication control adaptor 200 and a communication controller 210 is provided by a bus interface 400. A DMA controller 410 has the function of directly controlling read/write of data between a memory 110 operating as a main memory and a general register 440 through the bus interface 400. The DMA controller 410 is provided with a data storing register and a register storing the address of the DMA transfer object. Data send/receive between the general register 440 and a local memory 230 operating as work memory can be realized by an ALU 445. Numeral 420 designates a sequencer which executes a part of the function of a local processor by the microprogram control system. The local processor is constituted in addition to the sequencer 420 by the general register 440 and the ALU 445 in a similar manner to the general processor.

The sequencer 420 has the function of reading a program within the program storing memory 220 through the program memory interface 430 and interpreting and executing the program steps in sequence. The general register 440 is used for storage of the operation result of the ALU 445 and storage of data by the DMA function or the like. A read register 450 and a write register 455 are registers for read/write of data to the bus 130.

Data received from a line 260 is subjected to demodulation processing and serial/parallel conversion in the send/receive data processor 250, and is then entered in a data link layer controller 490. The data link layer controller 490 has the function of automatic zero removing or check by CRC (Cyclic Redundancy Code), for example, according to the protocol HDLC (High Level Data Link Control). And then, the received data is first stored in a receiving FIFO 460, and then matching performed between the data transmission speed and the inner processing speed such as by operation or control. On the contrary, in the case of transmission, the transmission data is stacked through the general register 440 to a send FIFO 465, and transmitted according to the transmission speed through the data link layer controller 490 and the send/receive data processor 250 to the line 260. In the case of transmission, the HDLC function such as, generating the CRC code or automatic zero inserting is performed in the data link layer controller 490. Also, the send/receive data processor 250 modulates data, for example, generates an AMI (Alternate Mark Inversion) code.

Figure 5A:
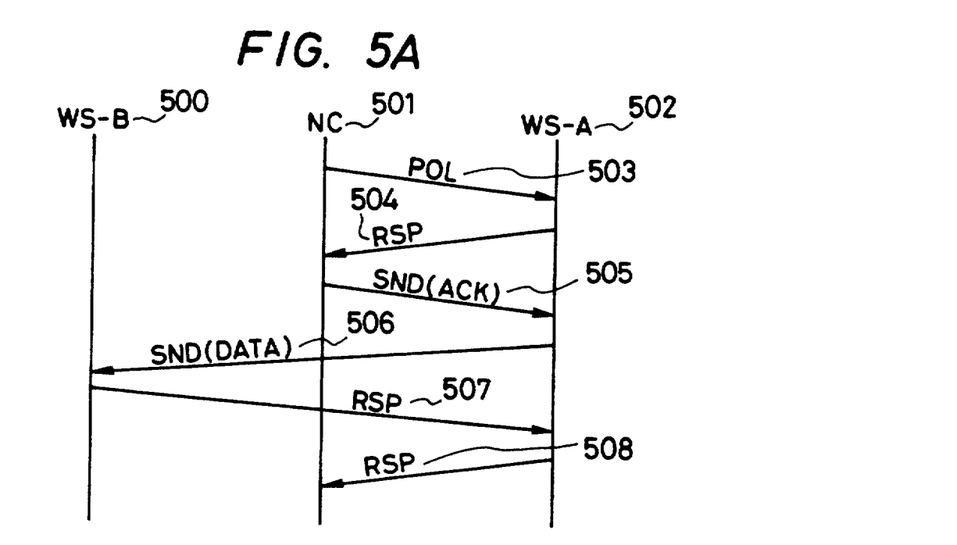
FIGS. 5A and 5B are diagrams illustrating send/receive of a frame in model between the terminal controller and two terminal devices in the embodiment of the invention.
Figure 5B:
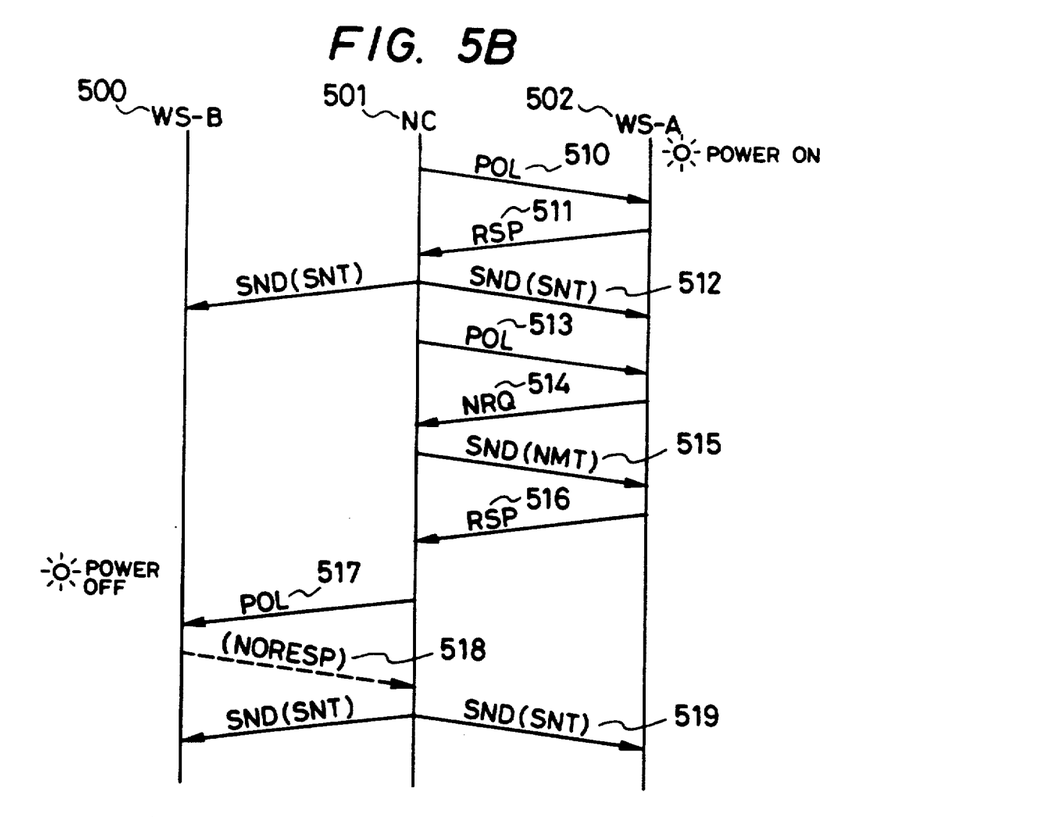

Next, operation of the embodiment of the invention will be shown specifically using FIGS. 5A, 5B, which are time charts representing a basic procedure for communication by the terminal devices 31-34 with each other or between the terminal devices 31-34 and the terminal controller 20.

FIG. 5A shows an example where data is transmitted from a terminal device A (hereinafter referred to as WS-A) 502 to a terminal device B (hereinafter referred to as WS-B) 500. If a polling frame (POL) 503 is transmitted from a terminal controller (hereinafter referred to as NC) 501 to the WS-A 502, an indication that the WS-A 502 has transmission data and is in a wait state is returned by a response frame (RSP) 504 to the NC 501. The NC 501 receiving the RSP frame 504 transmits a frame (SND(ACK)) 505 granting the right of sending data to the WS-A 502. The WS-A 502 transmits a data frame (SND(DATA)) 506 giving the address of the WS-B 500 of transmission destination station to the WS-B 500 without passing through the NC 501 The WS-B 500 returns a response frame (RSP) 507 to the WS-A 502, and the WS-A 502 transmits a response frame (RSP) 508 for opening the right of sending data to the NC 501. Thus, the series of data transmission steps is completed.

FIG. 5B shows an example where data representing the terminal status management information is sent in the case that the WS-A 502 is in the power source ON-state and becomes the initial state and in the case that the WS-B 500 is in the power source OFF-state. The NC 501 during the polling sequence transmits a POL frame 510 to the WS-A 502. That the WS-A 502 is in the initial state is indicated by a RSP frame 511 sent to the NC 501. The NC 501 updates the information regarding the WS-A 502 among the content of the terminal management table provided therein, and also transmits a SND (SNT) frame 512 simultaneously in order to transmit the update information as data to all terminal devices. This frame 512 is received simultaneously by the WS-A 502 and the WS-B 500, and the terminal management table within each terminal device is updated.

Thereby each terminal device can recognize that at present the WS-A 502 is in the initial state and transmission to the WS-A 502 becomes possible.

In response to the next POL frame 513 to the WS-A 502, the WS-A 502 returns a NRQ frame 514 in order to request transmission of the terminal management table to the NC 501. The NC 50 transmits the whole terminal management table to the WS-A 502 (that is, its own address is added to the WS-A 502) by a SND(NMT) frame 515, and the WS-A 502 responds by way of a RSP frame 516. Thereby the WS-A 502 can first grasp the state of all terminals after the power source is turned on.

On the other hand, if the NC 501 during the polling sequence transmits a POL frame 517 to the WS-B 500, and the WS-B 500 does not return the response due to the OFF-state of its power source, the NC 501 will recognize no response (NORESP) 518 by the time a supervisory timer therein times out. The NC 501 updates the status regarding the WS-B 500 in the terminal management table, and also transmits only the updated table content regarding the WS-B 500 as a SND(SNT) frame 519 simultaneously to all terminals. The WS-A 502 receives this frame 519 and thereby rewrites information regarding the WS-B 500 among the terminal management table information so as to recognize that transmission to the WS-B 500 is not possible.

Flow of control in the case of FIG. 5B will be described in detail referring to FIG. 3 and FIG. 4. Now, FIG. 4 shall be considered to represent the communication controller 210 within the WS-A 502 in this example. If the WS-A 502 is in the power source ON-state, the content of each register and the work memory is reset to the initial state. The WS-A 502 receives the POL frame 510 from the NC 501, and embeds the information for initializing in the RSP frame 511 and transmits it according to the microprogram stored in the memory 220 (FIG. 1).

In order to indicate that the WS-A 502 is in the power source ON-state from the NC 501 to all terminals, among the byte information corresponding to the WS-A 502 shown in FIG. 4 in the terminal management table, the $2^1$ bit (READY POL) is rewritten from "0" to "1". Only the byte representing the terminal management information of the WS-A 502 is constituted as the transmission data frame and is transmitted as the SND(SNT) frame 512.

Operation of the communication controller in the WS-A 502 receiving this frame will be described. In the data link controller 490, it is interpreted that the address of transmission destination station is a global address (i.e., representing transmission to all terminals). The HDCL processing is applied and then the frame is taken in the receiving FIFO 460. The terminal management information read from the receiving FIFO 460 to the read register 450 by the processing operation of the ALU 445 through the sequencer 420 according to operation of the microprogram is written through the work memory interface 480 to one byte area corresponding to the WS-A address within the terminal management table area 240 in the memory 230.

The sequencer 420 starts the DMA controller 410 during the send/receive processing, and performs the DMA transfer of the i byte information of an address portion corresponding to the WS-A 502 within the terminal management table 240 into the address portion corresponding to the WS-A 502 within the terminal management table area 120 in the upper side memory 110 (FIG. 1). According to this operation, the terminal status information of the WS-A 502 transmitted by the SND(SNT) frame 512 is written in the terminal management table 240 in the communication control adapter 200 within the WS-A 502, and also the terminal management table 120 in the upper side memory 110 can be rewritten. Consequently, the content of the two terminal management tables 120, 240 can be always made coincident.

In a similar manner, the NRQ frame 514 is transmitted corresponding to the POL frame 513 to the WS-A, 502, and transmission of the status management table of all terminals is requested by the NC 501. Processing of the SND(NMT) frame 515 transmitted from the NC 501 to the WS-A 502 is also performed in a similar manner to the case of the SND(SNT) frame receiving. In this case, the difference from the SND(SNT) frame receiving processing is that address of the transmission destination station is its own address, and the information written in the work memory 230 and the main memory 110 is the whole terminal management table regarding all terminals.

As above described, in receiving the terminal management table, information is first written into the work memory in the communication control adapter, and in parallel to the send/receive processing the information is written into the main memory area by the DMA operation. Consequently, independent of the processing of the MPU 100 (FIG. 1), the newest data can be stored in the main memory at the same time as the data receiving operation, thereby the MPU 100 can always access the newest data.

Regarding general receiving of data, the data can be also stored in the main memory at the same time it is received.

As described in detail, in accordance with the invention, the memory area storing the terminal management table to control the state of the terminal device and the terminal controller is provided both in the main memory and in the local memory, and rewriting of the table is performed only to the local memory, and at the same time the transfer to the main memory is performed by the DMA function, thereby the content of both can be always made coincident.

According to the invention, since control of the status management information of each communication processor is performed by the communication control adapter, the overhead for the communication control processing is obviated and the terminal management information can be controlled efficiently.

What is claimed is:

1. Communication processing system in a cluster communication system, in which a terminal control device controls a plurality of terminal devices using a polling system, each of the terminal devices comprising:
   a main processor connected to a bus;
   a main memory connected to said bus;
   a communication control adapter connected to said main processor and said memory through said bus, said communication control adapter being composed of a local processor, a local memory and a communication data send/receive circuit; and
   a terminal management table for storing terminal management information to indicate a state of each of the terminal devices, said terminal management information being used by said terminal control device during polling to determine whether transmission to another of said terminal devices is possible and if possible permitting data to be transmitted to said another of said terminal devices, said terminal management table being formed both in said memory and in said local memory. and said local processor controlling reading/writing of said terminal management information from/into said terminal management table.

2. Communication processing system according to claim 1, wherein said local processor in each terminal device rewrites said terminal management information in said terminal management table of said local memory and controls transfer of said terminal management information from said terminal management table of said local memory to said terminal management table of said main memory.

3. Communication processing system according to claim 2, wherein said communication control adapter further includes DMA means responsive to said local processor for transferring said terminal management information rewritten in said terminal management table of said local memory into said terminal management table of said main memory.

4. Communication processing system according to claim 1, wherein said local processor in one terminal device transmits said terminal management information in said local memory through said communication data send/receive circuit and a line to another of the terminal devices.

5. Communication processing system wherein a terminal controller sends/receives terminal management information corresponding to states of a plurality of terminal devices by a polling system, comprising:
   each of the terminal controller and the terminal devices being composed of a main processor, a main memory, and a communication control unit, all of which are connected through a bus;
   said communication control unit being composed of a local memory, a local processor and a communication data send/receive circuit; and
   terminal management tables being held in both said main memory and local memory for storing the terminal management information, the terminal management information stored in said terminal management table being re-written by said local processor, said terminal management information being used by said terminal controller during polling to determine whether transmission to one of said terminal devices is possible and if possible permitting data to be transmitted to said one of said terminal devices.

6. Communication processing system according to claim 5, wherein said communication control unit further includes DMA means responsive to said local processor for transferring the terminal management information from said local memory to said main memory, and said local processor rewrites the terminal management information of said terminal management table of said local memory and transfers the rewritten terminal management information to said main memory using said DMA means immediately after rewriting the terminal management information in said local memory.

7. Communication processing system according to claim 5, wherein said local processor in one of the terminal devices updates the terminal management information of said terminal management table, and transmits at least part of the information of said terminal management table through said communication data send/receive means and a line to another of the terminal devices.

8. In a communication control system, in which a terminal control device communicates with a plurality of terminal devices using polling, said terminal control device being connected to said terminal devices, each of the terminal control device and the terminal devices comprising:
   a main processor and a main memory, both connected to a bus;
   a communication control adapter connected to said bus, said communication control adapter including a local processor means connected to said a bus, a local memory connected to said local processor means, and send/receive data processing means connected to said local processor means; and
   terminal management tables formed in said main memory and in said local memory, each terminal management table storing terminal management information indicating a respective state of all of the terminal devices, said terminal management information being used by said terminal control device during polling to determine whether transmission to one of said terminal devices is possible and if possible permitting data to be transmitted to said one of said terminal devices, said terminal management information of said terminal management table formed in said local memory being managed by said local processor means.

9. The communication control system according to claim 8, wherein said local processor means has a function of direct memory access to said main memory, and operates to send said terminal management information stored in said terminal management table of said local memory via said bus to said terminal management table of said main memory by said direct memory access function.

10. The communication control system according to claim 9, wherein said local processor means includes bus interface means connected to said bus, memory interface means connected to said local memory, a data link control layer controller connected to said send/receive data processing means, DMA means connected between said bus interface means and said memory interface means to perform said direct memory access function, and sequence control means for controlling said local processor in response to a sequence program.

11. The communication control system according to claim 8, wherein said local processor means of the terminal control device operates to send said terminal management information stored in said local memory thereof via said send/receive data processing means thereof to said send/receive data processing means of the terminal devices, and each of the terminal devices stores said terminal management information in each local memory and said main memory of the respective terminal device.

12. A cluster communication processing system, in which a terminal controller detects terminal management information of a plurality of terminal devices by means of a polling system, and a plurality of the terminal devices are controlled in response to the terminal management information, the system comprising:
   the terminal controller and each of the terminal devices having a main processor, a main memory, and a communication control unit;
   said main processor being connected through a bus to said main memory;

said communication control unit being connected to said bus, said communication control unit having a local processor, a local memory being connected to said local processor and a communication data send/receive circuit being connected to said local processor for sending/receiving the terminal management information via a line;

a terminal management table for storing the terminal management information, said terminal management table being installed in each main memory and in each local memory, said terminal management information being used by said terminal controller during polling to determine whether transmission to one of said terminal devices is possible and if possible permitting data to be transmitted to said one of said terminal devices; and said communication control unit of the terminal controller having means for sending at least part of the terminal management information stored in said terminal management table via said line to said communication control units of the terminal devices.

13. A cluster communication processing system according to claim 12, wherein said communication control unit of the terminal devices operates to rewrite the terminal management information stored in the terminal management table of said local memory thereof in response to receipt of at least said part of the terminal management information sent from the terminal controller.

14. A cluster communication processing system according to claim 13, wherein said communication control unit has a direct memory access function, and at least said part of the terminal management information is sent from local memory to said main memory using said direct memory access function.

* * * * *